United States Patent
Jalloul et al.

(10) Patent No.: US 8,654,695 B2
(45) Date of Patent: Feb. 18, 2014

(54) LINK ADAPTATION OF A BROADCAST SYSTEM

(75) Inventors: Louay Jalloul, Santa Clara, CA (US); Sriram Mudulodu, Santa Clara, CA (US); Djordje Tujkovic, Santa Clara, CA (US); Kamesh Medepalli, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1358 days.

(21) Appl. No.: 12/002,208

(22) Filed: Dec. 14, 2007

(65) Prior Publication Data

US 2009/0154388 A1    Jun. 18, 2009

(51) Int. Cl.
*H04H 20/71* (2008.01)

(52) U.S. Cl.
USPC .......................................... 370/312

(58) Field of Classification Search
USPC ............ 370/328, 329, 252, 335; 455/525, 63, 455/67, 67.11, 63.1, 63.2, 67.13, 449
See application file for complete search history.

(56) References Cited

U.S. PATENT DOCUMENTS

| | | | |
|---|---|---|---|
| 6,360,076 B1* | 3/2002 | Segura et al. | 455/67.11 |
| 6,856,604 B2* | 2/2005 | Lundby | 370/312 |
| 6,909,753 B2* | 6/2005 | Meehan et al. | 375/240.27 |
| 7,164,890 B2* | 1/2007 | Eriksson et al. | 455/69 |
| 7,184,489 B2 | 2/2007 | Wang et al. | |
| 7,590,181 B2* | 9/2009 | Awad et al. | 375/259 |
| 7,729,306 B2* | 6/2010 | Shirota et al. | 370/329 |
| 2002/0010001 A1* | 1/2002 | Dahlman et al. | 455/522 |
| 2005/0163083 A1* | 7/2005 | Mantravadi et al. | 370/335 |
| 2006/0067416 A1* | 3/2006 | Tirkkonen et al. | 375/260 |
| 2006/0183287 A1 | 8/2006 | Collins et al. | |
| 2006/0198454 A1 | 9/2006 | Chung et al. | |
| 2007/0054624 A1 | 3/2007 | Kashiwagi | |

* cited by examiner

*Primary Examiner* — Thai Nguyen
(74) *Attorney, Agent, or Firm* — Sterne, Kessler, Goldstein & Fox PLLC (57) ABSTRACT

A method and apparatus of link adaptation of a broadcast system is disclosed. The method includes a base station adaptively determining a signal quality threshold. The base station broadcasts a signal, wherein the signal includes the signal quality threshold. A plurality of subscribers receives the signal, and measure a signal quality. Each of a subset of the plurality of subscribers transmits back to the base station an indicator of whether the received signal has a measured signal quality that is either above or below the signal quality threshold. A percentage of subscribers that receive the signal having a received signal quality above the signal quality threshold is estimated. A transmission modulation format and coding is selected based on the estimated percentage.

23 Claims, 7 Drawing Sheets

LINK ADAPTATION OF A BROADCAST SYSTEM

FIELD OF THE DESCRIBED EMBODIMENTS

The described embodiments relate generally to wireless communications. More particularly, the described embodiments relate to methods and systems for link adaptation of broadcast systems.

BACKGROUND

Recent years have witnessed increasingly active movement toward merger and integration of communications and broadcasting. An example of actual development or proposal is mobile devices that incorporate an analog or digital broadcast receiver (tuner) to receive program broadcasts. This trend of broadcasting being integrated into mobile communications is likely to continue.

Broadcast-type services are already implemented whereby one base station delivers the same information to multiple terminal station devices. These services are however not very popular yet, due to limited transmission capacity, expensive packet transmission fees, and the poor quality and low quantity of provided content in view of the fees.

The growth of bandwidth in wireless communications is attracting attention for its potential capability to handle video and other large amount of data, which is expected to open new opportunities in broadcast-type communications service. For example, broadcast type communication standards are progressing for the standardization of MBMS (Multimedia Broadcast/Multicast Service), or MBS.

The received signal quality of multi-cast transmission can vary greatly from receiver to receiver. For example, in a cellular multi-cast system, receivers (subscribers) located at the edges of the cells generally receive multi-cast signals having substantially less signal carrier to interference-plus-noise ratio (CINR) than receivers located very close to a multi-cast transmitting base station. As a result, selecting an order of modulation and coding can be difficult. That is, receivers located close to the transmitters can typically support much higher data rates than receivers located far away from the transmitters.

It is desirable for to have a system and method for improving link adaptation between a broadcasting base stations and receiving subscribers.

SUMMARY

An embodiment includes a method of link adaptation of a broadcast system. The method includes a base station adaptively determining a signal quality threshold. The base station broadcasts a signal, wherein the signal includes the signal quality threshold. A plurality of subscribers receives the signal, and measure a signal quality. Each of a subset of the plurality of subscribers transmits back to the base station an indicator of whether the received signal has a measured signal quality that is either above or below the signal quality threshold. A percentage of subscribers that receive the signal having a received signal quality above the signal quality threshold is estimated. A transmission modulation format and coding is selected based on the estimated percentage.

Another embodiment includes a system for adaptively controlling layered modulation of a multiple base station multicast broadcast service. The method includes a plurality of base stations each broadcasting a same layered modulation signal. A plurality of subscribers receiving the layered modulation signal, and each subscriber determines a signal quality of the received layered modulation signal. Each of the plurality of subscribers reports the signal quality back to the plurality of base stations. Each of the plurality of base stations collects the reported signal qualities over a predetermined period of time. Each of the plurality of base stations reports the collected signal qualities to a base station controller. The base station controller statistically determines a desired signal power differential between levels of the layered modulation signals based on the collected signal qualities.

Other aspects and advantages of the described embodiments will become apparent from the following detailed description, taken in conjunction with the accompanying drawings, illustrating by way of example the principles of the described embodiments.

DETAILED DESCRIPTION

Embodiments for link adaptation of a multiple base station multicast broadcast service are disclosed. The embodiments include control signals transmitted by subscriber that minimize the use of uplink transmission bandwidth.

Figure 1:
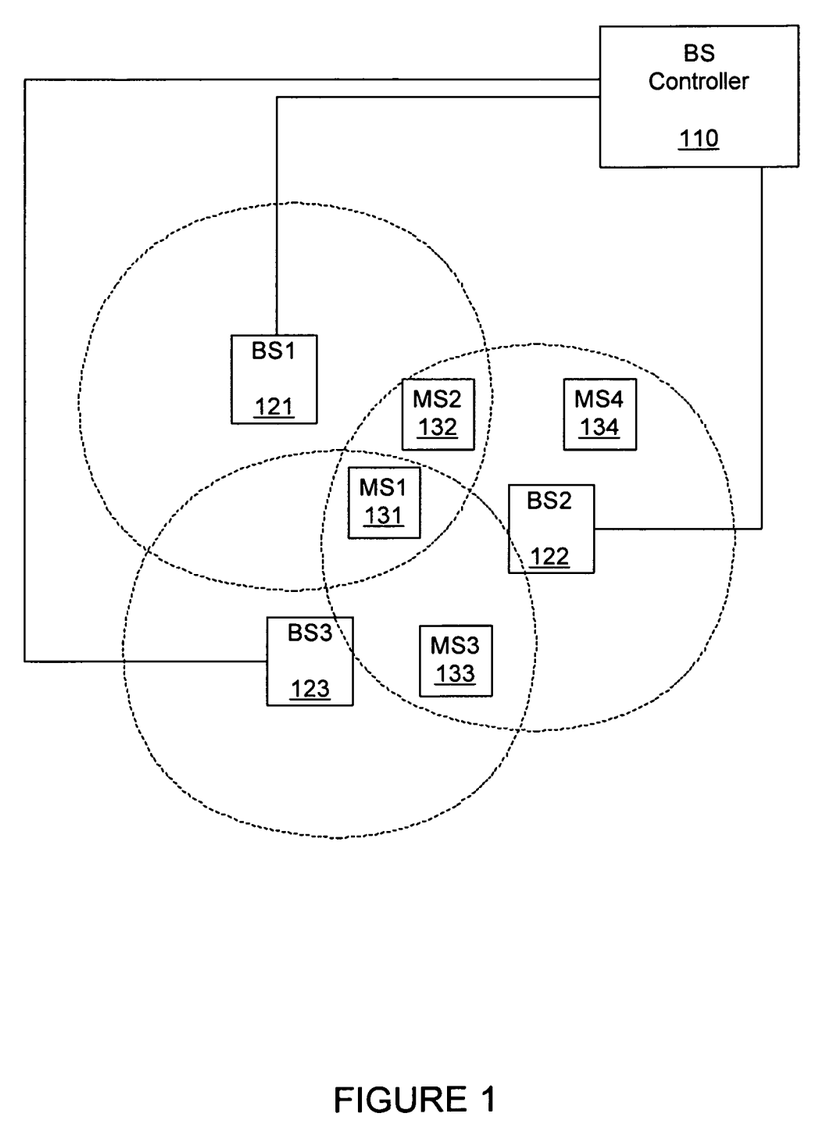
FIG. 1 shows an example of a multi-cast multiple base station wireless system.

FIG. 1 shows an example of a multi-cast multiple base station wireless system. The system includes a base station controller 110 that provides at least some control over base stations 121, 122, 123. The control can include, for example, the Modulation and Coding Scheme (MCS) of signals transmitted by the base stations 121, 122, 123 based on determinations of the link qualities associated with each base station 121, 122, 123. More specifically, the control can include selecting the order of the modulation and the rate of the coding of multi-broadcast system (MBS) transmission signals. As will be described, additional control can include setting and controlling a desired signal power differential between levels of the layered modulation signals transmitted from the base stations 121, 122, 123.

Generally, all of the base stations 121, 122, 123 are synchronized with each other. The base stations transmit multi-broadcast system MAPs which subscribers 131, 132, 133, 134 receive and decode to determine start times of MBS zones (data). The MBS broadcasts can be encrypted so that only subscribing subscribers 131, 132, 133, 134 can receive the MBS broadcasts. The base stations 121, 122, 123 can be used for both multicast and unicast transmission.

An embodiment includes the plurality of base stations 121, 122, 123 of the multi-broadcast system (MBS) each broadcasting signals having the same modulation and coding format. That is, each of the base stations broadcast the same information signals, and several different subscribers 131, 132, 133, 134 receive the broadcast information signals. Some of the subscribers (such as, subscribers 131, 132, 133) receive MBS signals from multiple base stations, whereas other subscribers (such as, subscriber 134) only receive MBS signals from a single base station.

Each of the subscribers 131, 132, 133, 134 can determine a signal quality of the received MBS signal. That is, each subscriber 131, 132, 133, 134 can measure signal qualities of the received signals, such as, carrier signal to interference plus noise ratio (CINR), carrier to noise ratio (CNR), bit error rate (BER), packet error rate (PER), block error rate (BLER). It is to be understood that this is not an exhaustive list.

For another embodiment, the signal quality of the received MBS signal can be determined from a probe packet included within the MBS signals. The probe packet includes known bits transmitted according to a selected transmission format. For an embodiment, the probe packet is at least intermittently transmitted. The base stations convey the transmission format (modulation, coding and/or layered modulation parameters) to the subscribers, so that the subscribers can demodulate and decode the probe packet. The probe packets can be useful for aiding in determining which transmission format provides the desired MBS signal coverage.

An embodiment includes that signal quality being reported back to the base stations by the subscribers by comparing the received signal quality with a threshold, and reporting back whether the received signal quality is above or below the threshold. One embodiment includes the base stations providing the subscriber with the threshold. The signal quality can be reported back by a simple indicator that indicates whether the received MBS signal was either above or below the threshold. The threshold can be variable, and provided to the subscribers by each of the base stations. As will be described, the threshold can be adapted based on the qualities of the received MBS signals. It can be more desirable for the subscribers to report back a threshold indicator rather than an actual signal quality measurement because the indicator can include less information than the signal quality measurement. As a result, uplink transmission bandwidth can be reduced.

Upon network entry, each of the subscribers 131, 132, 133, 134 typically establish communication with a single one of the base stations 121, 122, 123. Once communication between a base station and a subscriber is established, typically the subscriber maintains future communication with that base station, unless the subscriber physically moves and establishes communication with another base station.

For an embodiment, the subscribers 131, 132, 133, 134 each report the measured the signal qualities back to the base station that the subscriber has established communications with. This embodiment can include the reported transmissions being transmitted by each subscriber according to a predetermined schedule. That is, the reporting is typically coordinated. The scheduling can be specified by the base stations or by the base station controller 110. For an embodiment, the scheduling is structured so that each subscriber only transmits the signal quality reports during intermittent uplink (subscriber to base station) frames as determined by the transmission schedule. That is, only a subset of the uplink frames includes the signal quality of each subscriber. Intermittent transmissions occupy less transmission air-time than continual transmissions.

An embodiment includes the base stations collecting the reported signal qualities over a predetermined period of time. The predetermined period of time is generally set by a reporting duty cycle. The reporting duty cycle can be set by the level of reporting intermittency and the number of subscribers. The predetermined period of time should be long enough to produce a statistically significant number of samples (indicators).

An embodiment includes the plurality of base stations reporting the collected signal qualities to the base station controller (such as, base station controller 110). That is, an embodiment includes each of the base stations (such as, base stations 121, 122, 123) collecting the reported signal qualities over a period of time, and then reporting the signal qualities of the subscribers to the base station controller.

An embodiment includes the base station controller statistically determining a desired signal power differential between levels of the layered modulation signals based on the collected signal qualities as will be described.

Figure 2:
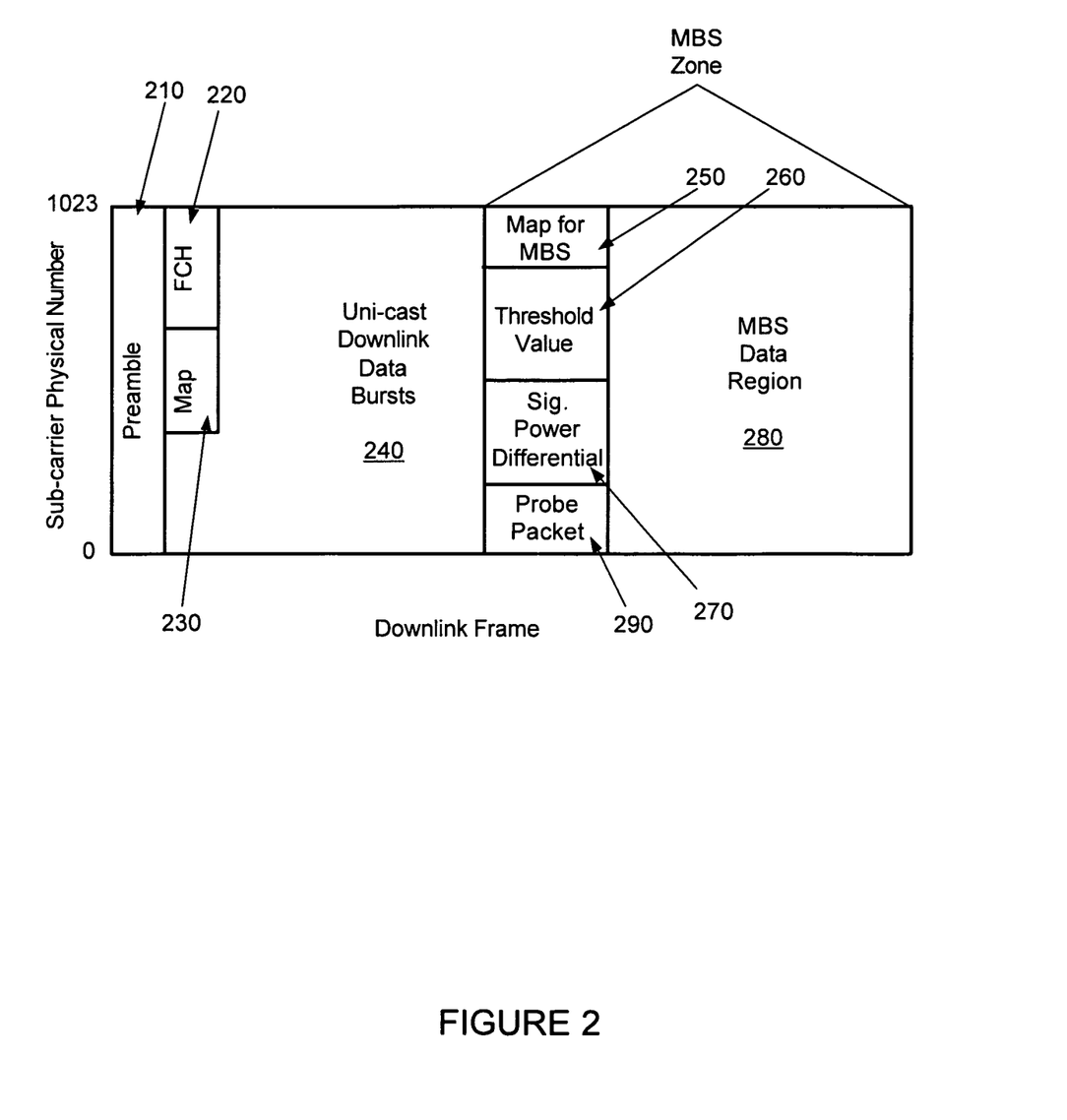
FIG. 2 shows an example of a downlink frame of a wireless broadcast system that includes a multi-cast link adaptation embodiment.

FIG. 2 shows an example of a downlink frame of a wireless broadcast system that includes multi-cast link adaptation embodiments. The downlink frame includes a number of multi-carrier symbols, in which each multi-carrier symbol includes, for example, 1023 sub-carriers. The downlink frame of FIG. 2 includes a preamble 210, a frame control header 220, a downlink data map 230, uni-cast downlink data 240, a multi-broadcast system (MBS) map 250, a threshold value 260, a signal power differential 270 (which can be used for layered modulation), and MBS data 280, and a probe packet 290.

As shown in FIG. 2, the downlink frame can provide each of the subscribers with the threshold value. As described, the threshold value can be adaptive, wherein the most recent adapted value is provided within the downlink frame. Additionally, the signal power differential of layered modulation MBS signals can be adaptive, and also provide within the downlink frames. The downlink data MAP 230 can provide subscribers with schedules of the uni-cast downlink data 240, and the MBS MAP 250 can provide the subscribers with schedules of the MBS data 280. An embodiment of the MAPs 230, 250 is a pointer that describes how information is formatted, such as, modulation coding, starting symbol, ending symbol, start frequency, stop frequency and other data format information.

An embodiment includes the subscribers measuring the received signal quality using pilot sub-carriers in an MBS zone (shown in FIG. 2). Another embodiment includes each of the base stations broadcasting a probe packet (for example, probe packet 290 of FIG. 3) which contains known bits. The subscribers measure the signal quality using the probe packet. For example, the subscribers determine whether they can decode the probe packet with an acceptable level of quality (above the signal quality threshold, or another signal quality threshold).

Figure 3:
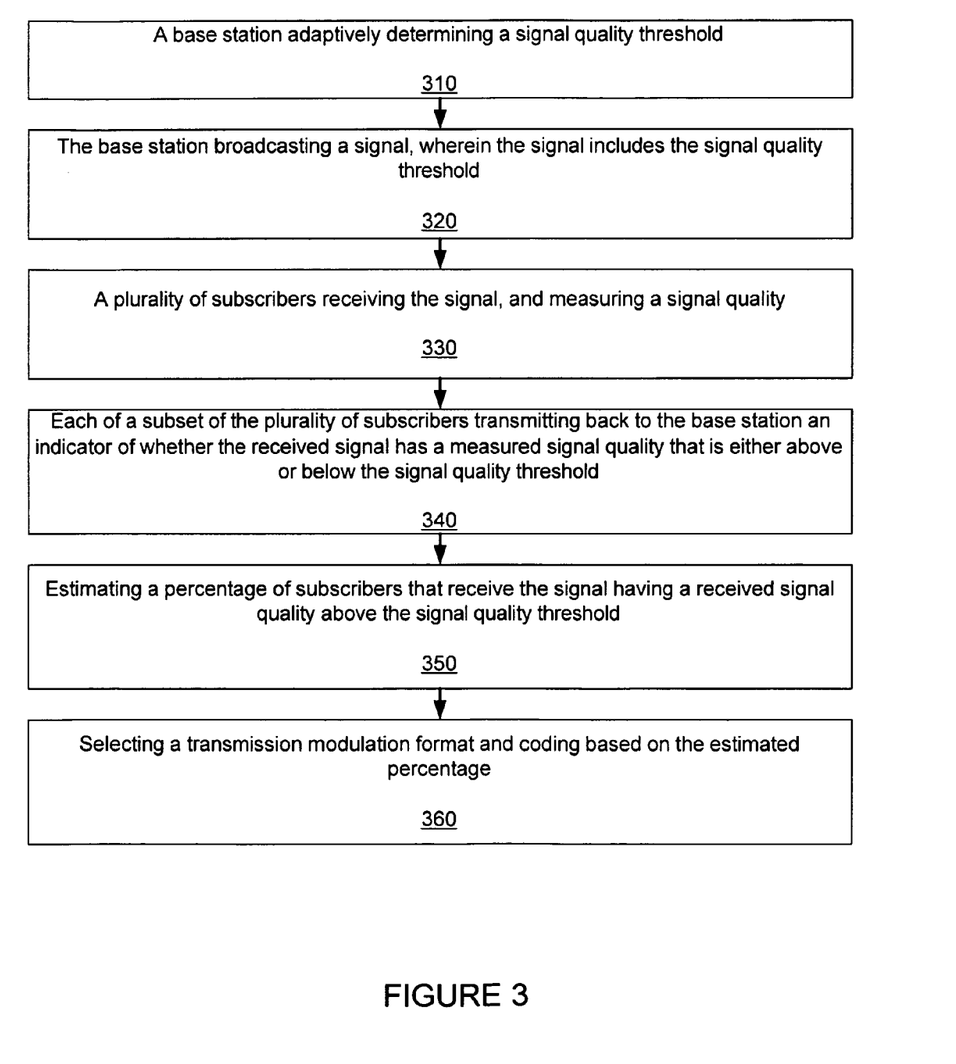
FIG. 3 is a flow chart that includes steps of one example of a method of link adaptation of a broadcast system.

FIG. 3 is a flow chart that includes steps of one example of a method of link adaptation of a broadcast system. A first step 310 includes a base station adaptively determining a signal quality threshold. A second step 320 includes the base station broadcasting a signal, wherein the signal includes the signal quality threshold. A third step 330 includes a plurality of subscribers receiving the signal, and measuring a signal quality. A fourth step 340 includes each of a subset of the plurality of subscribers transmitting back to the base station an indicator of whether the received signal has a measured signal quality that is either above or below the signal quality threshold. A fifth step 350 includes estimating a percentage of subscribers that receive the signal having a received signal quality above the signal quality threshold. A sixth step 360 includes selecting a transmission modulation format and coding based on the estimated percentage.

An embodiment includes the base station (or perhaps a base station controller) adaptively determining the signal quality threshold based on the estimated percentage. Initially, the signal quality threshold can be set to a default value. Subsequently, the signal quality threshold can be adaptively determined or adaptively updated based on an estimated percentage of subscribers that receive the signal having a received signal quality above the signal quality threshold.

The signal quality of the broadcast signal can be measured in a variety of different ways. Exemplary measured signal qualities include one or more of CINR (carrier to interference/noise ratio), CNR (carrier to noise ratio), BER (bit error rate), PER (packet error rate), block error rate (BLER).

The signal qualities of the broadcast signals can be collected over time. The base stations can collect the signal qualities (indicators) reported back to the base stations, and/or the subscribers can collect the received signal qualities over time. The percentages, can therefore, be estimated over time.

An embodiment includes each multi-cast base stations estimating a percentage of subscribers that receive a multi-cast signal having a received signal quality above the signal quality threshold. The estimates being based on the indicators fed back to the base stations by the subscribers.

The base stations can be at least partially controlled by a base station controller. The base station controller can manage several base stations. An embodiment includes the base station controller estimating the percentage of subscribers that receive transmitted signal above the signal quality threshold for each of the plurality of base stations. Additionally, the base station controller can select transmission modulation formats and coding based on the estimated percentage for each of the plurality of base stations. The base station controller conveys the modulation and coding formats to the base stations.

For one embodiment, the base station controller forms a master histogram of the percentages of received signal qualities that exceed the quality threshold based on, for example, histograms of each of the base stations the base station controller is controlling. Based on the master histogram, the base station controller conveys back to each individual base station what modulation and coding format should be used by the base station for providing a desired MBS coverage. For example, the base station controller can form a histogram based on the previously described measurements (CINR, CIR, BER, PER, BLER). The histogram can be translated to a cumulative distribution function (CDF), and a modulation and coding format can be selected from the CDF to ensure only a small percentage (for example, 5%) are left in outage with the base stations transmitting according to the selected modulation and coding format. Additionally, the base station controller can select that power differential for layered modulation based on the CDF.

Due to the potentially large number of subscribers within the multi-base cells, the feedback of the indicators to the multi-cast stations can occupy valuable frequency bandwidth and transmission uplink air-time. Therefore, additional embodiments of the multi-cast system include methods of managing the uplink transmission of the indicators by the subscribers. The managed transmission of the indicators reduces the uplink interference and uplink throughput as compared to transmitting the indicators within, for example, every uplink frame. An embodiment includes subscribers only reporting the indicators if the signal quality at the subscriber is below the quality threshold. In an wireless network in which most of the subscribers have a received signal quality above the threshold, only having subscribers having a received signal quality below the quality threshold can save additional uplink bandwidth.

An embodiment includes each subscriber transmitting back the indicators within scheduled frames, wherein the transmitting back of each subscriber occurs intermittently within the scheduled frames. The scheduled frames can be managed by the multi-cast base stations, or by the base station controllers. The scheduled frames can be managed to avoid interference between subscribers during transmitting back by each of the subscribers.

An embodiment includes the subscribers transmitting the indicators back through a designated multiple access channel. One example of the multiple access channels in an orthogonal frequency division multiplexing (OFDM) system includes a set of sub-carriers on which subscribers can transmit information (for example, indicators). Each of the subscribers transmits the indicator back to its associated base station using a code randomly chosen from a predetermined set of codes. Each base station can decode the coded signals to determine which of the subscribers is transmitting the indicators.

An embodiment of the transmission modulation format selection includes selecting a desired signal power differential between levels of layered modulation signals. Layered modulation is a format in which different orders of modulation are simultaneously transmitted.

The desired signal power differential between different modulation formats of the layered modulation can be determined by the multi-cast base stations or by the base station controller. That is, an embodiment includes a base station controller providing the desired signal power differential to a plurality of base station. The plurality of base stations broadcasts the layered modulation signal having the desired signal power differential between levels of the layered modulation signals. For an embodiment, the base station controller determines the desired signal power differential by determining a histogram based estimated percentages. The base station controller estimates the desired signal power differential needed to ensure a percentage of wireless links between the base stations and the subscribers that have a desired level of signal quality, based on the histogram.

Figure 4:
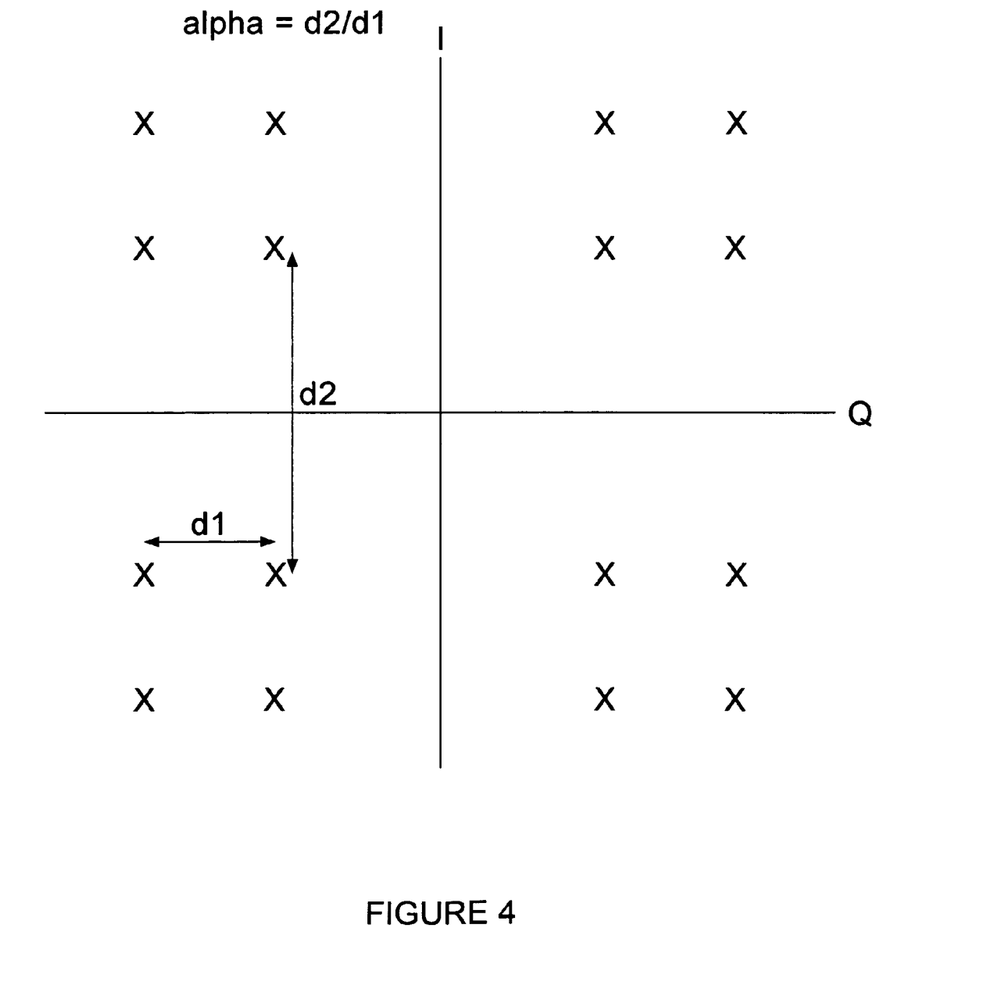
FIG. 4 shows an I-Q diagram representation of layered modulation signals.

FIG. 4 shows an example of an I-Q diagram representation of layered modulation signals. This I-Q diagram includes a 16QAM/4QAM layered modulation constellation. Depending upon a signal quality of the layered modulation signal at a receiver of the layered modulation, the layered modulation is demodulated at 16QAM or 4 QAM accordingly. That is, if the received signal quality is above a threshold, the received signal is demodulated as a 16QAM signal. If the received signal quality is below the threshold, the received signal can be demodulated as a 4QAM signal.

An important parameter of layered modulation is signal power differential between levels of the layered modulation signals as defined by d1 and d2 of FIG. 4. More specifically, the signal power differential can be defined by d2 divided by d1. The previously mentioned cumulative distribution function (CDF) can be used to select the signal power differential to ensure only a small percentage (for example, 5%) are left in outage with the base stations transmitting according to the selected signal power differential.

Figure 5:
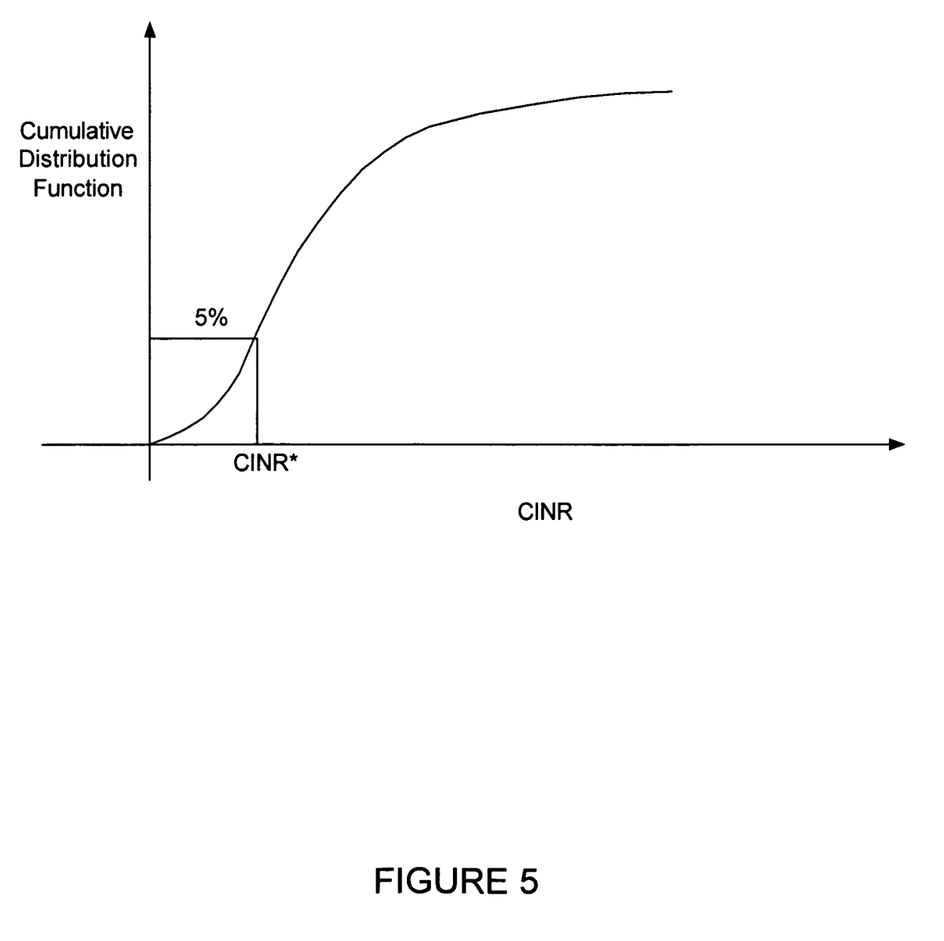
FIG. 5 shows an example of a histogram of reported subscriber received signal qualities that can be used to determine a desired signal power differential between levels of the layered modulation signals.

FIG. 5 shows an example of a histogram of reported subscriber received signal qualities that can be used to determine a desired signal power differential between levels of the layered modulation signals. The histogram provides the cumulative distribution function that identifies, for example, a CINR* that corresponds with a certain percentage (as shown, 5%) of outage. A look up table can be generated to provide a conversion between the signal power differential and the value of the CINR*.

Figure 6:
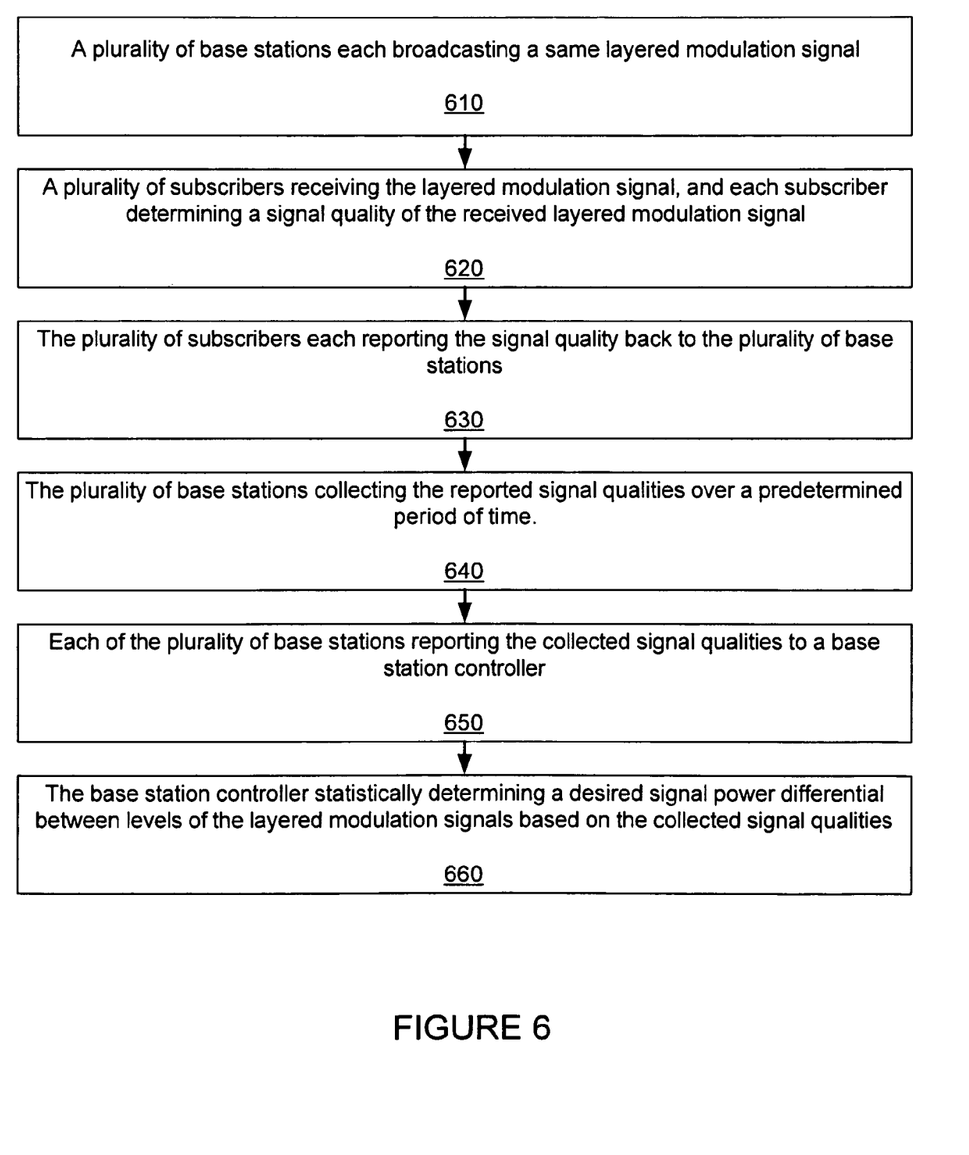
FIG. 6 is a flow chart that includes steps of an example of a method of adaptively controlling layered modulation of a multiple base station multicast broadcast service.

FIG. 6 is one example of a flow chart that includes steps of a method of adaptively controlling layered modulation of a multiple base station multicast broadcast service. A first step 610 includes a plurality of base stations each broadcasting a same layered modulation signal. A second step 620 includes a plurality of subscribers receiving the layered modulation signal, and each subscriber determining a signal quality of the received layered modulation signal. A third step 630 includes the plurality of subscribers each reporting the signal quality back to the plurality of base stations. A fourth step 640 includes the plurality of base stations collecting the reported signal qualities over a predetermined period of time. A fifth step 650 includes each of the plurality of base stations reporting the collected signal qualities to a base station controller. A sixth step 660 includes the base station controller statistically determining a desired signal power differential between levels of the layered modulation signals based on the collected signal qualities.

The plurality of subscribers can report the signal qualities back to the plurality of base stations within scheduled frames, wherein the reporting of each subscriber occurs intermittently within the scheduled frames. Additionally, the reporting back of the subscribers can be coordinated to avoid interference between subscribers during reporting by each of the subscribers.

As described, the base station controller statistically determines the desired signal power differential between levels of the layered modulation signals based on the collected signal qualities. Once determined, the base station controller provides the desired signal power differential to the plurality of base stations. The plurality of base stations can then broadcasts layered modulation signals having the desired signal power differential between levels of the layered modulation signals.

One embodiment of the base station controller statistically determining the desired signal power differential between levels of the layered modulation signals based on the collected signal qualities includes the base station controller determining a histogram based on the collected signal qualities. The base station controller can estimate the desired signal power differential needed to ensure a percentage of wireless links between the base stations and the subscribers that will have a desired level of signal quality, based on the histogram.

An embodiment of the histogram includes plots of a cumulative distribution function versus received signal quality.

Figure 7:
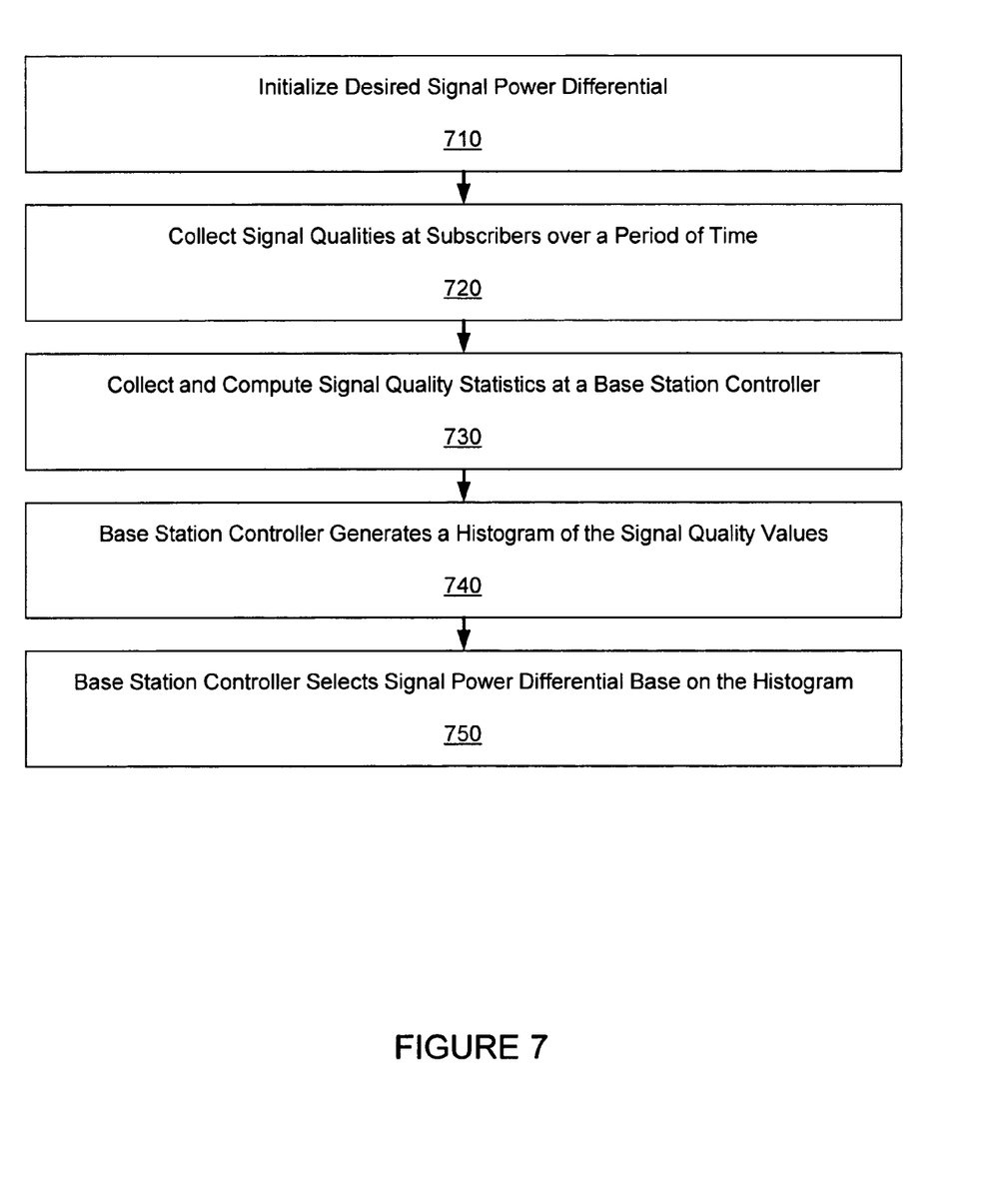
FIG. 7 is a flow chart that includes steps of an example of a method of a base station controller of an MBS system selecting a signal power differential of layered modulation.

FIG. 7 is a flow chart that includes steps of an example of a method of a base station controller of an MBS system selecting a signal power differential of layered modulation. A first step 710 includes setting the desired signal power differential of layered modulation MBS signals to an initial value. The initial value can be selected based on prior simulation, computation or testing. A second step 720 includes the subscribers collecting signal qualities of the received MBS signals over a period of time. The period of time is selected to be long enough to collect a statistically significant number of samples. A third step 730 includes a base station controller collecting and computing signal quality statistics. The signal qualities are collected by the subscribers reporting the received signal qualities to the base stations, and the base stations then reporting the received signal qualities to the base station controller. A fourth step 740 includes the base station controller generating a histogram of the signal quality values. The histogram can be based on the statistics that have been computed. A fifth step 750 includes the base station controller selecting a signal power differential of the layered modulation BMS signals Although specific embodiments of the invention have been described and illustrated, the invention is not to be limited to the specific forms or arrangements of parts so described and illustrated. The invention is limited only by the appended claims.

What is claimed:

1. A method of link adaptation of a broadcast system, comprising:
   determining a signal quality threshold;
   broadcasting a signal to a plurality of subscriber devices, wherein the signal comprises the signal quality threshold;
   receiving an indicator from a subset of the plurality of subscriber devices, wherein the indicator specifies whether a subscriber device received the signal with a measured signal quality that is above or below the signal quality threshold;
   estimating a percentage of subscribers that receive the signal having a received signal quality above the signal quality threshold;
   selecting a transmission modulation format and coding based on the estimated percentage, wherein the signal is a layered modulation signal, and the selecting the transmission modulation format and coding comprises selecting a desired signal power differential between levels of the layered modulation signal; and
   adaptively determining the signal quality threshold based on the estimated percentage.

2. The method of claim 1, wherein the broadcasting the signal includes broadcasting the signal including a probe packet comprising known bits transmitted according to a selected transmission format.

3. The method of claim 2, further comprising:
   conveying the selected transmission format to the plurality of subscriber devices within a MAP.

4. The method of claim 2, wherein the measured signal quality is obtained by each of the plurality of subscriber devices measuring a signal quality of the probe packet, and transmitting the indicator to a base station.

5. The method of claim 1, further comprising:
   increasing the signal quality threshold and changing the transmission modulation format and coding when the estimated percentage increases with respect to a previously estimated percentage.

6. The method of claim 5, further comprising:
   estimating, in a base station controller, the percentage for each of the plurality of subscriber devices.

7. The method of claim 6, further comprising:
   selecting a transmission modulation format and coding based on the estimated percentage for each of the plurality of subscriber devices.

8. The method of claim 5, further comprising:
   transmitting the indicators within intermittent scheduled frames.

9. The method of claim 5, further comprising:
   transmitting the indicator through a designated multiple access channel.

10. The method of claim 9, wherein transmitting the indicator includes transmitting the indicator to a base station through the multiple access channel using a code randomly chosen from a predetermined set of codes.

11. The method of claim 1, wherein the measured signal quality comprises at least one of CINR, CIR, BER, PER, and BLER.

12. The method of claim 1, further comprising:
collecting estimated percentages over time.

13. The method of claim 1, further comprising:
estimating, in a plurality of multi-cast base stations, a percentage of subscriber devices that receive a multi-cast signal having a received signal quality above the signal quality threshold.

14. The method of claim 13, further comprising:
transmitting the indicators by the plurality of subscriber devices, the transmitting being coordinated to avoid interference between transmissions of the indicators by the plurality of subscriber devices.

15. The method of claim 1, further comprising:
providing the desired signal power differential to a plurality of base stations;
broadcasting, from the plurality of base stations, the layered modulation signal having the desired signal power differential between levels of the layered modulation signals.

16. The method of claim 15, wherein the layered modulation comprises 4QAM and 16QAM.

17. The method of claim 15, wherein the providing the desired signal power differential to a plurality of base stations comprises:
determining a histogram based on the estimated percentages; and
estimating the desired signal power differential needed to ensure a percentage of wireless links between the base stations and the subscriber devices that will have a desired level of signal quality, based on the histogram.

18. The method of claim 1, wherein the broadcast system comprises a multi-cast system.

19. The method of claim 1, wherein the selecting the transmission modulation format and coding adjusts the percentage of subscribers having a received signal quality above the signal quality threshold.

20. A system for adaptively controlling layered modulation of a multiple base station multicast broadcast service, comprising:
a base station configured to broadcast a layered modulation signal;
a base station controller; and
a plurality of subscriber devices, each of the plurality of subscriber devices configured to determine a signal quality of the broadcasted layered modulation signal, and to report the determined signal quality back to the base station, wherein
the base station is configured to collect the reported signal qualities over a predetermined period of time, and to report the collected signal qualities to the base station controller, and
the base station controller is configured to statistically determine a desired signal power differential between levels of the layered modulation signal based on the collected signal qualities to adjust a percentage of subscribers having a signal quality above a signal quality threshold.

21. The system of claim 20, wherein the layered modulation comprises 4QAM and 16QAM.

22. The system of claim 20, wherein the base station controller is configured to provide the desired signal power differential to a plurality of base stations by determining a histogram based on the estimated percentages, and
estimating the desired signal power differential needed to ensure a percentage of wireless links between the base stations and the subscriber devices that will have a desired level of signal quality, based on the histogram.

23. A system, comprising:
a base station configured to:
determine a signal quality threshold;
broadcast a signal to a plurality of subscriber devices, the signal including the determined signal quality threshold;
receive an indicator from a subset of the plurality of subscriber devices, the indicator specifying whether a subscriber device received the signal with a measured signal quality that is above or below the signal quality threshold;
estimate a percentage of subscribers that receive the signal having a received signal quality above the signal quality threshold;
select a transmission modulation format and coding based on the estimated percentage, wherein the signal is a layered modulation signal, and the selecting the transmission modulation format and coding comprises selecting a desired signal power differential between levels of the layered modulation signal; and
adaptively determine the signal quality threshold based on the estimated percentage.

* * * * *